United States Patent [19]

Fujita et al.

[11] Patent Number: 4,654,797

[45] Date of Patent: Mar. 31, 1987

[54] COMPUTER TOMOGRAPHY SYSTEM WHEREIN PREPROCESSING, CONVOLUTION AND BACK PROJECTION COMPUTATIONS ARE PERFORMED PRIOR TO EXTERNAL DATA STORAGE

[75] Inventors: Kenjiro Fujita; Yasuro Takiura, both of Tokyo, Japan

[73] Assignee: Yokogawa Medical Systems, Limited, Tokyo, Japan

[21] Appl. No.: 588,502

[22] Filed: Mar. 12, 1984

[30] Foreign Application Priority Data

Dec. 27, 1983 [JP] Japan ............................. 58-244838

[51] Int. Cl.⁴ .......................................... G06F 15/42
[52] U.S. Cl. .................................... 364/414; 378/901
[58] Field of Search ................... 382/54, 56; 364/414; 378/2, 19, 27

[56] References Cited

U.S. PATENT DOCUMENTS

| | | | |
|---|---|---|---|
| 4,042,811 | 8/1977 | Brunnett | 364/414 |
| 4,044,240 | 8/1977 | Cox, Jr. | 364/414 |
| 4,181,939 | 1/1980 | Lyons | 364/414 |
| 4,426,731 | 1/1984 | Edland | 382/56 |
| 4,504,909 | 3/1985 | Acharya | 364/414 |

*Primary Examiner*—Charles E. Atkinson
*Assistant Examiner*—Gail Hayes
*Attorney, Agent, or Firm*—Moonray Kojima

[57] ABSTRACT

A radiation CT system packs projection data and reads the data in a DMA mode, and separates the packed data into individual data items through format conversion when the data are to be processed. The system has a memory for storing raw projection data and processed image data for one full image. With this arrangement, a high speed processing program for image reconstruction can be executed exclusively for image reconstruction immediately after scanning operation has started. During image reconstruction processing, no data transfer to and from an external memory is performed, thereby to reduce the period of time required for image reconstruction after data have been collected.

2 Claims, 12 Drawing Figures

COMPUTER TOMOGRAPHY SYSTEM WHEREIN PREPROCESSING, CONVOLUTION AND BACK PROJECTION COMPUTATIONS ARE PERFORMED PRIOR TO EXTERNAL DATA STORAGE

BACKGROUND OF THE INVENTION

1. Field of Invention

This invention relates to a radiation computerized tomography system, and more particularly to such a system wherein a data processing system is used for processing a flow of data in sequence between data collection and image reconstruction.

2. Description of Prior Art

Various computerized tomography (hereinafter referred to as "CT") systems have heretofore been known which employ radiation, such as X-rays, gamma rays or nuclear magnetic resonance (NMR) and electron beams (these rays and beams will herein generally and collectively be referred to as "radiation").

Also, various signal processing systems for such tomography systems are known, such as, for example, that disclosed in U.S. Pat. No. 4,135,247. Particular terminology of functions and components used therein may be found in this patent, and are applicable to the field of tomography in general.

FIG. 1(a) is a block diagram of a conventional X-ray CT system. As shown in FIG. 1(a), an X-ray source 1 irradiates a subject with a fan-shaped beam of X-rays, as shown by the dotted lines, and the X-rays, having passed through the subject 2, are detected by a detector 3 composed of an arcuate array of detecting elements curved about X-ray source 1. Each of the detecting elements generates an electric signal dependent on the intensity of the X-ray falling thereon. The electrical signals, or projection data, are read by a data acquisition system (hereinafter referred to as "DAS") 4 for each view, and then converted into digital signals which are led to a central processing unit (hereinafter referred to as "CPU") 5. The CPU 5 transfers the data either directly, or after subjecting them to pre-processing, to a storage unit 6 (hereinafter referred to as "DISK") comprising a magnetic disk, for example. After data for all views have been transferred to DISK 6, a high speed processing unit (hereinafter referred to as "FP") 7 effects arithmetic operations of the projection data for purpose of image reconstruction. Then, a reconstructed image is displayed on a display unit (hereinafter referred to as "DISP") 8. With this system, however, as can be appreciated from study of the time diagram of FIG. 1(b), CPU 5 is occupied by data transfer process during scanning operation for successively storing output signal from DAS 4 into DISK 6. Thus, almost all of the image reconstruction processing is effected after scanning operation has been completed. The processed image data are stored in DISK 6 again and also transferred to DISP 8 where they are displayed. Thus, disadvantageously, it takes a long period of time for the conventional system to display the image after scanning has been completed.

Another system has been proposed, as shown in FIG. 2(a) to overcome the foregoing difficulty. With this proposed system a high speed processing unit FP 21 is interfaced with DAS 4 and is connected between DAS 4 and CPU 5 for purpose of simplifying data flow during scanning operation. But, as can be appreciated from study of the time chart of FIG. 2(b), because of a program in FP 21 for reading data from DAS 4, the process which FP 21 can perform during scanning operation only includes pre-processing and convolution on data from DAS 4 for each view. Disadvantageously, back projection is effected only after scanning operation has been completed. This system is advantageous in that the time required until an image can be displayed is reduced since data processing after the scanning cycle is of a lesser extent than that of the above described system. However, disadvantageously, there is idle time while waiting for a next series of view data in the scanning operation, as can be seen in FIG. 2(b).

FIG. 3(a) depicts another prior system, which includes two high speed processing units (FP1 and FP2) 31,32. Front FP1 31 interfaces with DAS4 and effects preprocessing and convolution, while rear FP2 32 connected between FP1 31 and CPU 5, performs back projection. Data processed by FP1 31 are delivered in a pipelining fashion to FP2 32 in synchronism with each view, and the data is subjected in FP2 32 to back projection processing for each view.

Thus, image reconstruction is completed substantially at the same time that a scanning cycle is brought to an end, as shown in the time diagram of FIG. 3(b). Although the system of FIG. 3(a) can greatly reduce the time required for image reconstruction, disadvantageously, it is highly expensive, since two expensive high speed processing units (FP) are required.

Also, computation for image reconstruction is usually performed in a processing unit having a longer bit length than that of raw data in order to maintain a required degree of accuracy. For example, the processing unit effects a 32 bit integer or floating point arithmetic operation on raw data comprising 16 bit integer. Thus, the image reconstruction apparatus has processing and memory units capable of handle data of long bit lengths. Where raw data are delivered into the memory unit in the image reconstruction apparatus by way of direct memory access (herein referred to as "DMA"), the operation can be effected at higher speed. However, the memory has idle storage locations since it only receives raw data of short bit length.

SUMMARY OF THE INVENTION

Accordingly, an object of the invention is to overcome the aforementioned and other disadvantages and deficiencies of the prior art.

Another object is to provide a data processing system, for CT systems, which is capable of reducing the interval of time required to reconstruct images from collected data obtained by radiation passed through a subject, without any accompanying increase in cost.

A further object is to provide an arithmetic processing unit capable of high speed processing with direct memory access, while eliminating idle storage locations in the memory unit.

The foregoing and other objects are attained by the invention which encompasses a high speed processing unit having an interface capable of receiving data from a DAS, while a program for receiving data is not necessary, and a memory for storing raw data delivered through the interface from the DAS and processed entire image data. Immediately after scanning operation has started, an FP program can be executed exclusively for image reconstruction. During image reconstruction processing, no data transfer to and from a disk is performed, thereby reducing the period of time required for image reconstruction, after data has been collected. Furthermore, taking into consideration the difference between the bit length of data to be handled by a computing block and that of raw data, a plurality of raw data are packed, stored to memory in a DMA mode. When data are to be processed, the packed data are separated into individual data through bit number conversion. Thus, the memory can be effectively utilized without impairing the processing speed of the computing block.

DETAILED DESCRIPTION OF PREFERRED EMBODIMENTS

Figure 2A:
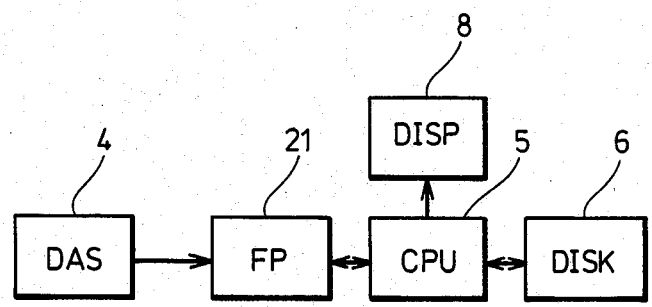
Figure 2B:
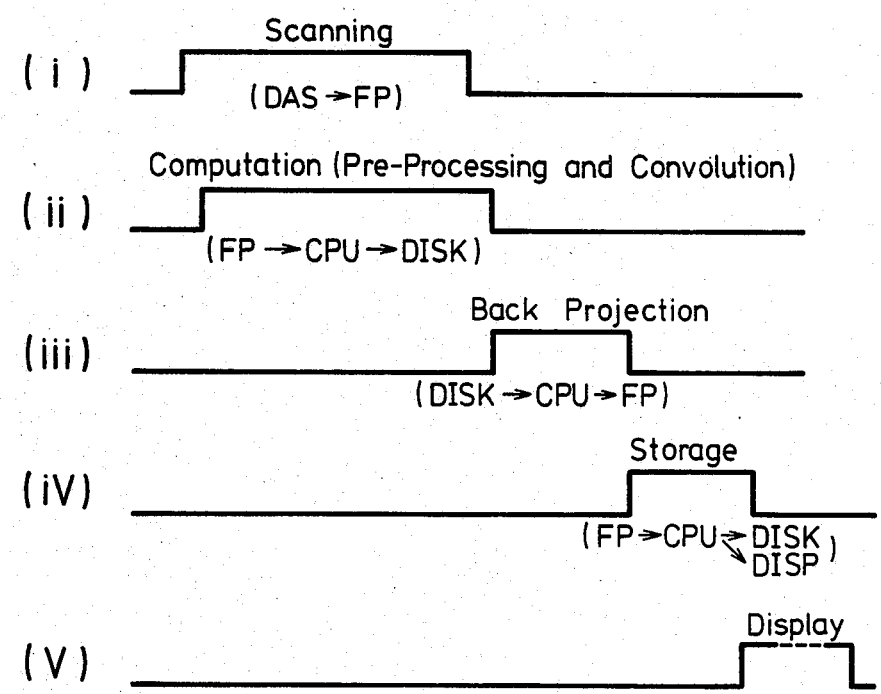
Figure 3A:
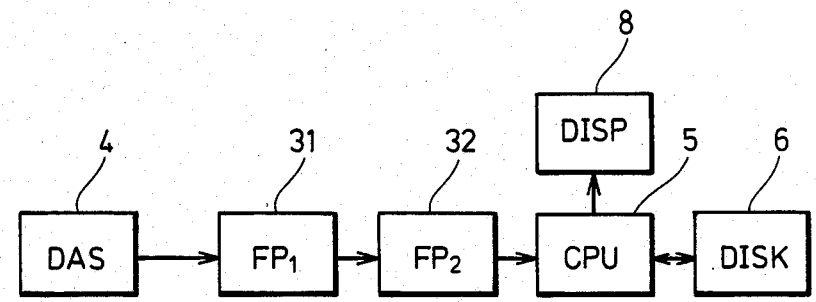
Figure 3B:
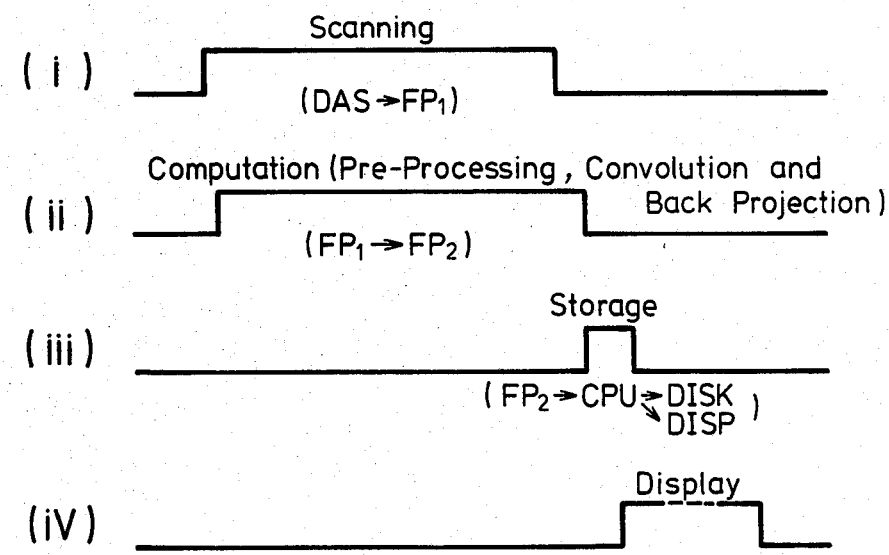
Figure 4A:
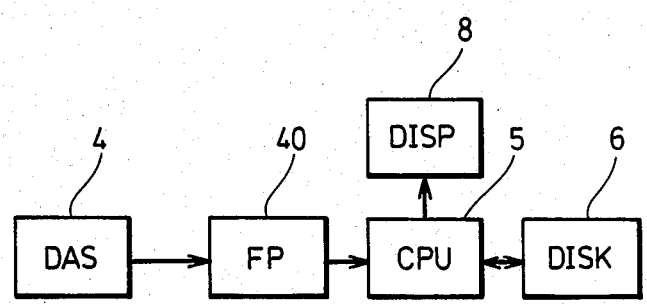
FIG. 4(a) is a block diagram depicting an illustrative embodiment of the invention.

FIG. 4(a) shows, in block diagram form, an illustrative data processing system according to the invention. The data processing system is similar in construction to that shown in FIG. 2(a) insofar as a high speed processing unit FP 40 is interposed between a DAS 4 and a CPU 5. However, the unit 40 of this invention is of a novel construction, as shown in greater detail in FIG. 5, and operates in a more advantageous manner.

Figure 5:
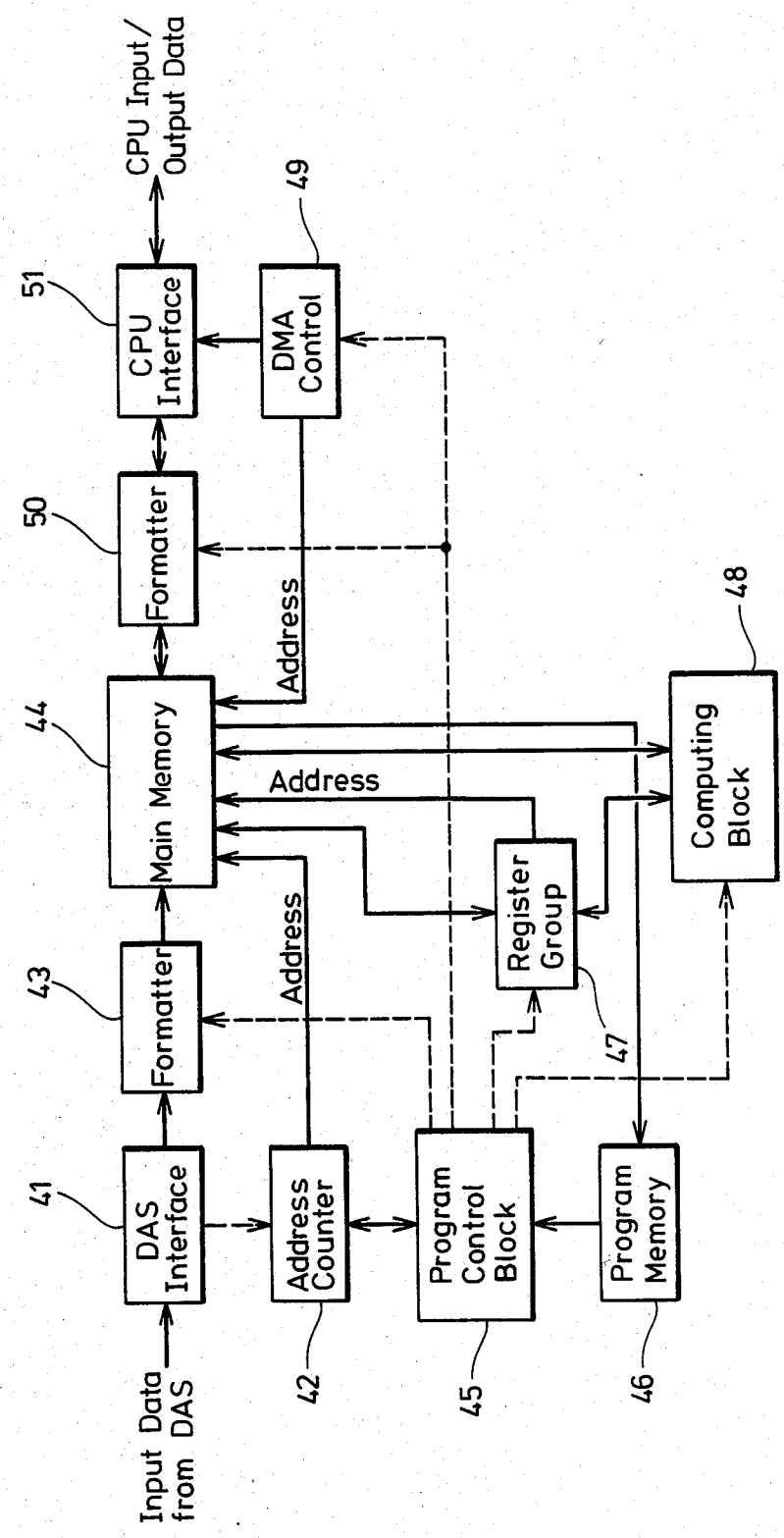
FIG. 5 is a block diagram depicting a high speed processing unit of the invention.

As illustrated in FIG. 5, the high speed processing unit 40 of FIG. 4(a) comprises an address counter 42, in which an address for starting storage of input data from DAS 4 is set prior to start of scanning operation. The content of address counter 42 is incremented or decremented each time data are stored to indicate raw data storage addresses in a main memory 44. Raw data are written or stored into main memory 44 in a cycle stealing manner between program cycles. A program stored in program memory 46 is executed under control of a program control block 45.

More specifically, the content of address counter 42 is sensed; the progress of a scanning operation is determined, on basis of difference between the sensed content of address counter 42; and data preset prior to starting of scanning operation; raw data on a first view, are read from main memory 44; and then subjected to preprocessing, convolution (or FFT which means Fast Fourier Transform), and back projection.

If raw data on a second view, have been completely read before the above cycle of processing has been completed, then the program proceeds to process the second view data. Thus, data processing can be performed uninterruptedly until data on a final view are processed.

Figure 4B:
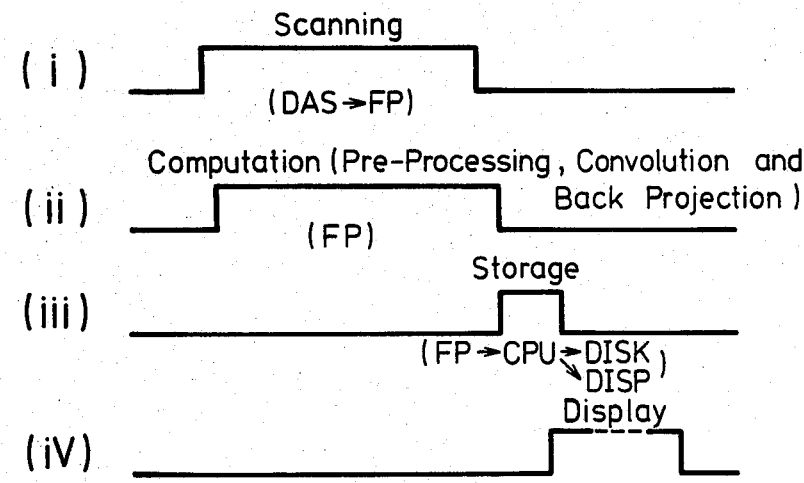
FIG. 4(b) is a timing chart depicting operation of the embodiment of FIG. 4(a).

The input data for each view from DAS 4 are delivered into main memory 44 through a DAS interface 41 and a formatter 43. Accordingly, a program can be executed exclusively for image reconstruction, irrespectively of data input from DAS 4, as illustrated in the time chart of FIG. 4(b).

Main memory 44 has a capacity large enough to store image data for one full image and raw data of one scan. It is sufficient to provide one scanning area, as the area for storing raw data. However, the storage size can be compressed by effecting suitable format conversion (to be described hereinafter) with formatter 43. Without providing a memory area for raw data corresponding to all views in one scanning, the so-called exchange buffer method may be used wherein an address pointer is reset to an initial value to receive data from an intermediate view.

Main memory 44, with the input data received from DAS 4, is addressed by a register group 47, controlled by program control block 45, for delivering data to or receiving data from, a computing block 48, directly or through register group 47. Computing block 48 is controlled by program control block 45 for effecting various processes, such as pre-processing, convolution (or FFT) and back projection, and the results (image data) are stored into main memory 44.

When computation is finished for all views, a DMA control 49 is actuated to convert the format of output data from main memory 44, with a formatter 50, and transfer the converted data through a CPU interface 51, into the CPU 5, in a DMA mode. The data thus obtained are stored in DISK 6 and can be displayed as a visual image on DISP 8.

Pre-processing, convolution and back projection are effected normally for each view. However, the program can be modified to carry out these different processings for one batch of several views. The back projection may be performed in a direct method or an indirect method. In the indirect method, interpolation for conversion from a fan-shaped beam, to a parallel beam is started when all data, for a number of views necessary for such interpolation, become available.

Figure 6:
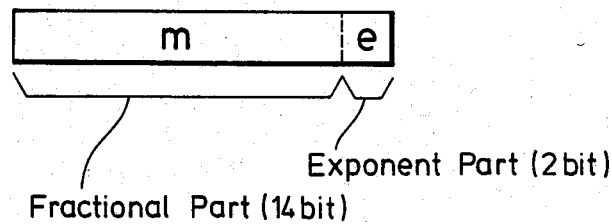
FIGS. 6, 7 and 8 are diagrams depicting data formats.
Figure 7:
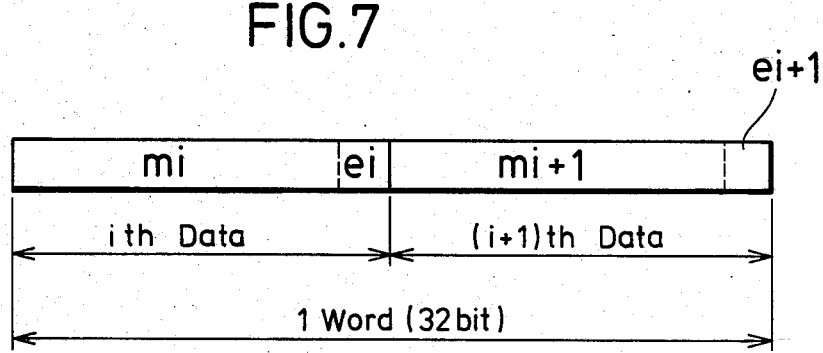

Format conversion using the formatters 43,50 will now be described. The formatter 43 packs together two of the input data from DAS 4, which have a data format, such as shown in FIG. 6, to form one word composed of 32 bits, as shown in FIG. 7. In FIG. 6 the data format is a 16 bit arrangement having a 14 bit fractional part m and a 2 bit exponent part e. The formatter 43 then successively transfers such converted data into raw data memory in main memory 44 in a DMA mode. As a result, the memory capacity, advantageously, may be half the conventional capacity in which one data has been assigned to one word and stored. Data in the raw data memory are thereafter fed to computing block 48 (see FIG. 5) and may be stored as desired in DISK 6 (see FIG. 4(a)) through CPU interface 51.

Figure 8:
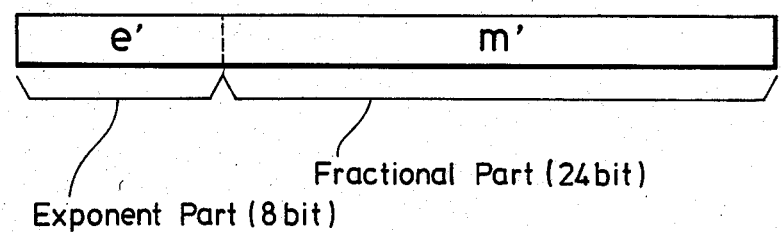

Computing block 48 separates the data shown in FIG. 7 read from the raw data memory into upper and lower data, and converts them into a format, such as shown in FIG. 8, that can be processed by computing block 48. The format may have an 8 bit exponent part e' and a 24 bit fractional part m', as shown in FIG. 8. The computing block 48, then effects image reconstruction computation on projection data of such format, and stores obtained image reconstruction data into main memory 44. Thereafter, the image data are read from main memory 44, through CPU interface 51, into CPU 51 and displayed as an image on DISP 8.

Although in the foregoing embodiment, the input data have a bit length of 16 bits/word and the data for the raw data memory and the computing block have a bit length of 32 bits/word, the invention is not limited to such bit lengths. The data format is not limited to the floating point notation, but may be of other forms of notation.

Figure 1A:
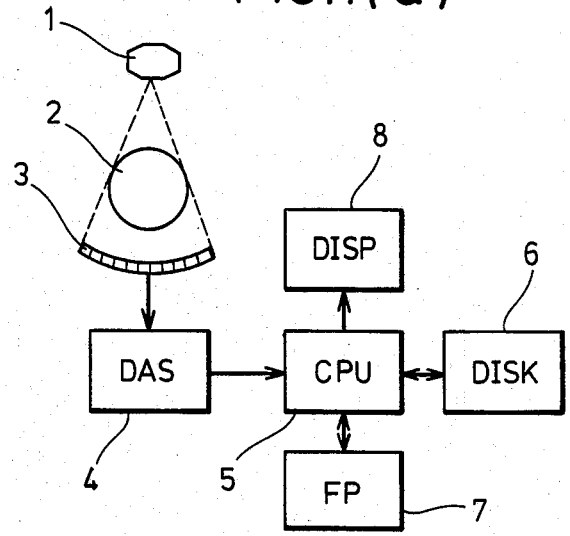
FIGS. 1(a), 1(b); 2(a), 2(b) and 3(a), 3(b), are block diagrams and associated timing charts of conventional data processing systems for CT systems.
Figure 1B:
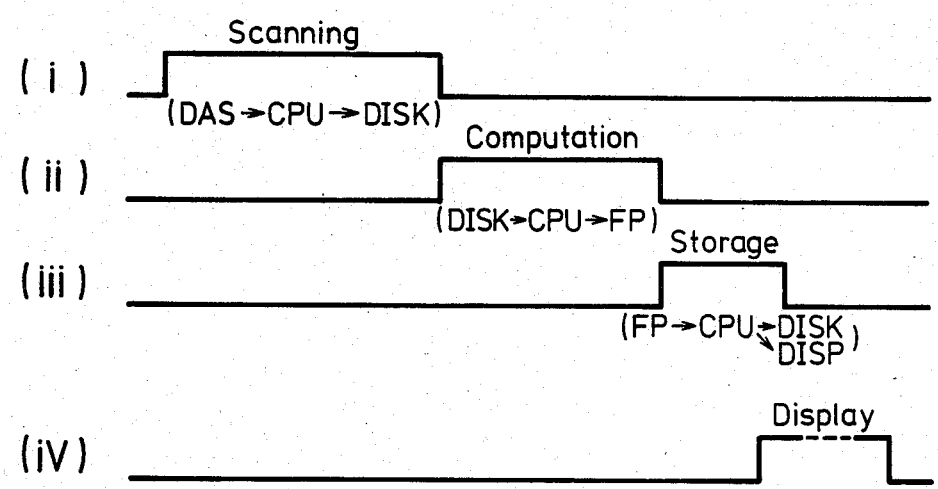

With the invention, data from a DAS can be obtained in a DMA mode, and there is provided a high speed processing unit having a memory of capacity large enough to store both the input data from the DAS and the image reconstruction data. The program for running the high speed processing unit can be executed continuously during scanning operation irrespective of data input from the DAS, so that the time required to gain image reconstruction data after the first input data have been received can be substantially shortened. With the high speed processing unit being of relatively simple construction, a data processing system for CT systems, can be provided at substantially the same cost as that of the conventional systems shown in FIGS. 1(a) and 2(a).

Also, according to the invention, a plurality of input data (raw data) are packed together into one word which is stored in a raw data memory. For subsequent computation for image reconstruction, such combined data are separated into a plurality of data and converted into a format that can be processed by a computing block. Thus, the capacity of the memory for storing raw data may be one half or less of the capacity of a prior memory in which one raw data is stored as one word. Thus, advantageously, the memory of this invention, can be effectively utilized.

Furthermore, advantageously, this invention has a format conversion capability for converting separated data into various desired formats so that there are no limitations on the format of input data and data processing can be simplified where data are generated.

The invention is applicable to all types of CT systems such as those using X-rays, NMR, electron beams, gamma rays, etc.

Although a preferred embodiment has been described, it should be understood that many changes, modifications, and extensions may be made in the invention, without departing from the spirit and scope of the invention.

What is claimed is:

1. A radiation computer tomography system comprising a radiation source (1) irradiating in a scanning operation a subject (2) with a beam of radiation;

a plurality of detectors (3) for detecting the beam of radiation having passed the subject (2), each of said detectors (3) issuing projection data dependent on the intensity of the radiation falling thereon;

a data acquisition system (4) for reading said projection data from said plurality of detectors (3) and converting said projection data into digital data;

a high-speed processing unit (40) having an interface with the data acquisition system (4) for simplifying the digital data flow during scanning operation;

a central processing unit (5) connected to the output of said high-speed processing unit (40);

a storage unit (6) for storing digital data transferred from said central processing unit (5); and a display unit (8) connected to said central processing unit;

wherein said high-speed processing unit (40) comprises a main memory (44) for storing the digital data;

an interface (41) for supplying the input digital data from the data acquisition system (4) to the main memory (44);

an address counter (42) for indicating the input digital data storage addresses in the main memory (44) in a cycle stealing manner; and a computing block (48) for pre-processing, convolution, and back projection of input digital data in the main memory (44) and for storing processed data in the main memory (44) irrespective of data input from the data acquisition system (4) to the main memory (44).

2. The system of claim 1, wherein the high-speed processing unit (40) further comprises a format conversion means (43) provided between the interface (41) and the main memory (44) for supplying the input digital data to the main memory (44) in a packed data form.

* * * * *